United States Patent [19]

Moore et al.

[11] Patent Number: 4,566,001

[45] Date of Patent: Jan. 21, 1986

[54] TOUCH STRIP INPUT FOR DISPLAY TERMINAL

[75] Inventors: Timothy G. Moore, Ottawa; David G. Dockendorff, Kanata; Stephen J. Harris, Ottawa, all of Canada

[73] Assignee: Northern Telecom Limited, Montreal, Canada

[21] Appl. No.: 464,959

[22] Filed: Feb. 8, 1983

[51] Int. Cl.$^4$ ............................ G09G 1/00; G09G 3/00
[52] U.S. Cl. .................................... 340/711; 340/706; 340/709; 340/365 VL; 178/18; 178/19
[58] Field of Search ............. 340/706, 707, 708, 709, 340/710, 711, 365 VL, 365, S, 365 P; 178/18, 19

[56] References Cited

U.S. PATENT DOCUMENTS

| | | | |
|---|---|---|---|
| 3,898,643 | 8/1975 | Ettlinger | 340/707 X |
| 4,193,119 | 3/1980 | Arase et al. | 340/707 X |
| 4,202,041 | 5/1980 | Kaplow et al. | 340/712 X |
| 4,204,204 | 5/1980 | Pitstick | 340/712 |
| 4,238,792 | 12/1980 | Cohen et al. | 340/712 X |
| 4,310,839 | 1/1982 | Schwerdt | 340/709 X |

Primary Examiner—John W. Caldwell, Sr.
Assistant Examiner—Vincent P. Kovalick
Attorney, Agent, or Firm—Stuart L. Wilkinson

[57] ABSTRACT

The screen of a display terminal has touch strips extending adjacent horizontal and vertical edges. The touch strips have electrical outputs dependent on the position along the strips at which they are touched. Using microprocessor control the touch strips can be made to manipulate a displayed image and control the rate or level or other terminal functions. By selecting an appropriate programming mode the touch strips can be made to present a series of programmable or soft keys. Also the touch strips can be used to provide a menu selection, scrolling and cursor generation and movement for word processing. The use of two touch strips requires less complex circuitry than a known transparent input overlay for the display screen. Moreover, it is a cleaner technique resulting in reduced image attenuation and distortion.

18 Claims, 3 Drawing Figures

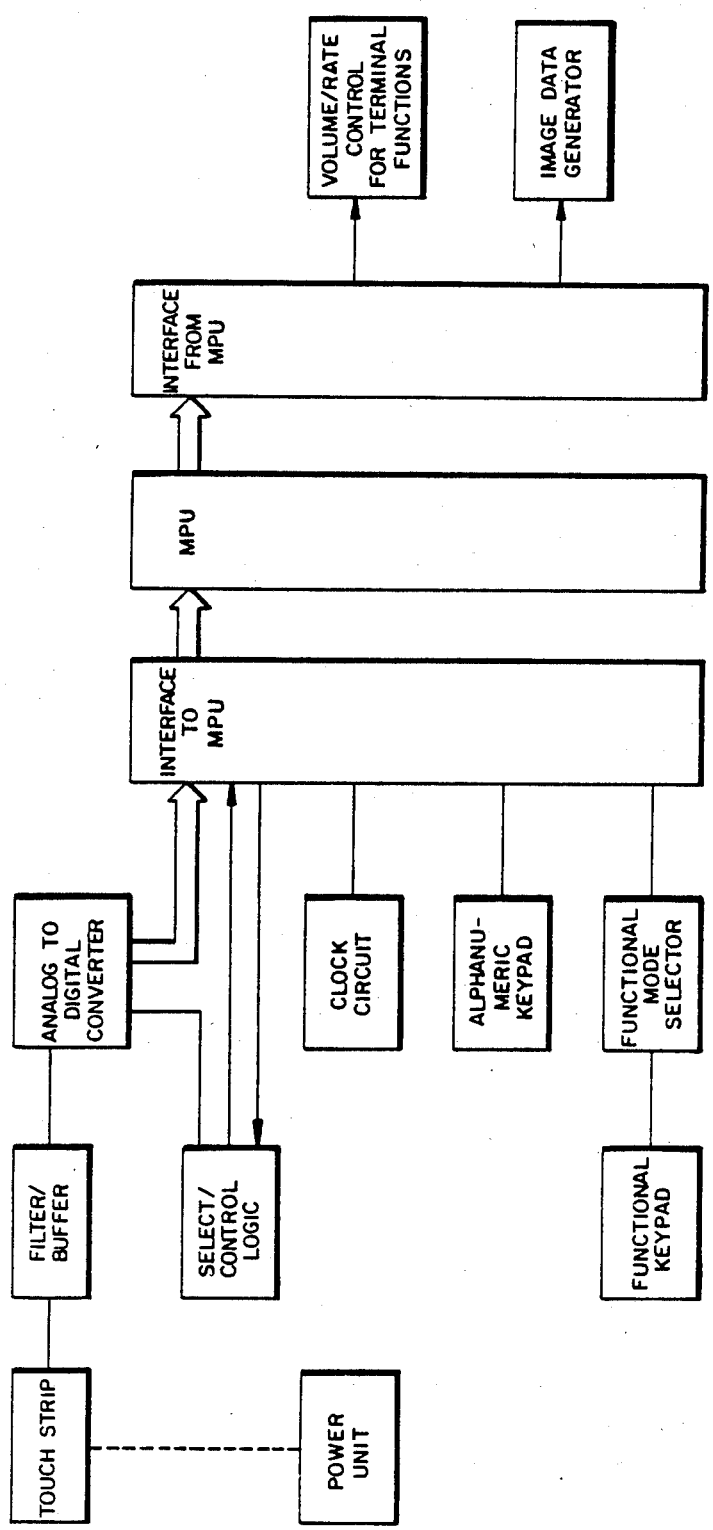

TOUCH STRIP INPUT FOR DISPLAY TERMINAL

This invention relates to an interactive display terminal.

An input device for most interactive display terminals is a keyboard which typically has an array of alphanumeric keys and a number of additional functional keys such as shift, erase, etc. To limit the keyboard size, a known development of the conventional keyboard has several blank or soft keys which can be given any of a number of functional designations. Processor control enables the functional designation of each soft key to be changed if and when desired during use.

One implementation of the soft key keyboard is used in the Displayphone (registered trademark), a combined telephone and display terminal marketed by Northern Telecom. In the Displayphone, the programmable or "soft" keys are located as a linear series at the rear of the keyboard and the currently assigned soft key designation selected by the user is displayed in the bottom few lines of the associated cathode ray tube (CRT) display. This equipment is limited to soft keys which are fixed in number and in length of assigned display space. More flexibility would be permitted by a variable number of variable length soft keys.

Interactive display terminals are known in which a touch sensitive transparent input device overlies the whole terminal screen. Such input devices have row and column conductors on opposed surfaces. When the device is touched a pulsed signal applied cyclically to the row conductors appears at a specific time on a specific one of the column conductors. From this, the position touched is determined and an appropriate output is taken to a controlling processor.

In order to achieve high resolution, the overlay, must have a very dense array of conductors on opposed surfaces which causes some attenuation and distortion of the displayed image. Moreover, because the screen is repeatedly touched, dirt and skin oils can also add to attenuation and distortion.

According to the invention there is provided a terminal comprising a display unit having a display screen, and a position sensitive touch strip extending along an edge of the screen, the touch strip having an output in response to its being touched by a user, the nature of the output being dependent on the distance along the strip of the position touched by a terminal user.

The display screen can be of rectangular form having the touch strip extending along one edge. A second touch strip can be mounted to extend along an adjacent edge of the screen in a direction perpendicular to the direction in which the first touch strip extends. The strip or strips can be mounted at positions offset from the screen. Alternatively touch strips can be mounted on a bezel surrounding the screen. In another alternative, the touch strip can be mounted on the screen but at a location so as not unduly to distort or block a displayed image.

Preferably the touch strip has an analog output, the analog output taken to an analog-to-digital converter to provide an encoded digital output to a processor for use in controlling the display. For example a touch strip functioning as a voltage divider, can have a strip of resistive material spaced from a strip of conductive material, means for establishing a voltage gradient along the resistive strip, means maintaining the strips spaced apart unless the touch strip is pressed to establish electrical contact between the conductive and resistive strips some distance along the touch strip. The voltage at the selected location on the resistive strip is transferred to the conductive strip and appears as an input to the analog-to-digital converter.

An embodiment to the invention will now be described by way of example, with reference to the accompanying drawings in which:

FIG. 3 is a block schematic diagram showing the operation of the FIG. 1 terminal;

Figure 1:
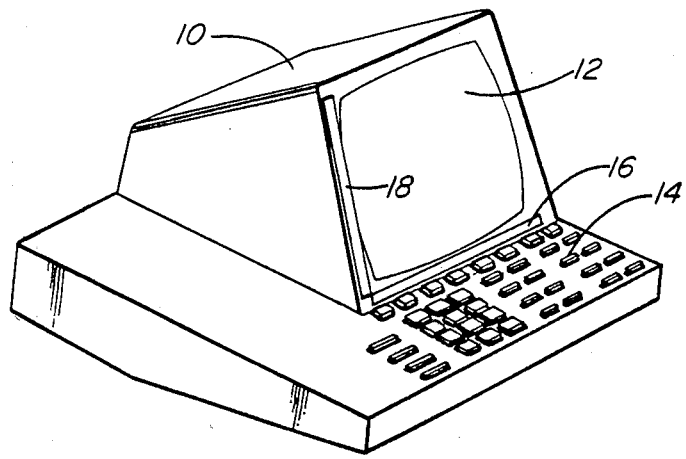
FIG. 1 shows a perspective view of a terminal according to the invention.

Referring firstly to FIG. 1, the terminal illustrated has a cathode ray tube (CRT) unit 10 with a rectangular screen 12. In front of the screen is a keyboard 14 which has a conventional set of alphanumeric keys and a number of additional functional keys such as shift and erase. Extending horizontally and vertically along two edges of a bezel surrounding the rectangular screen are touch sensitive strips 16 and 18 respectively. The vertical and horizontal touch strips are of identical construction and in use each has a voltage output which is representative of the distance along it at which it is touched.

Figure 2:
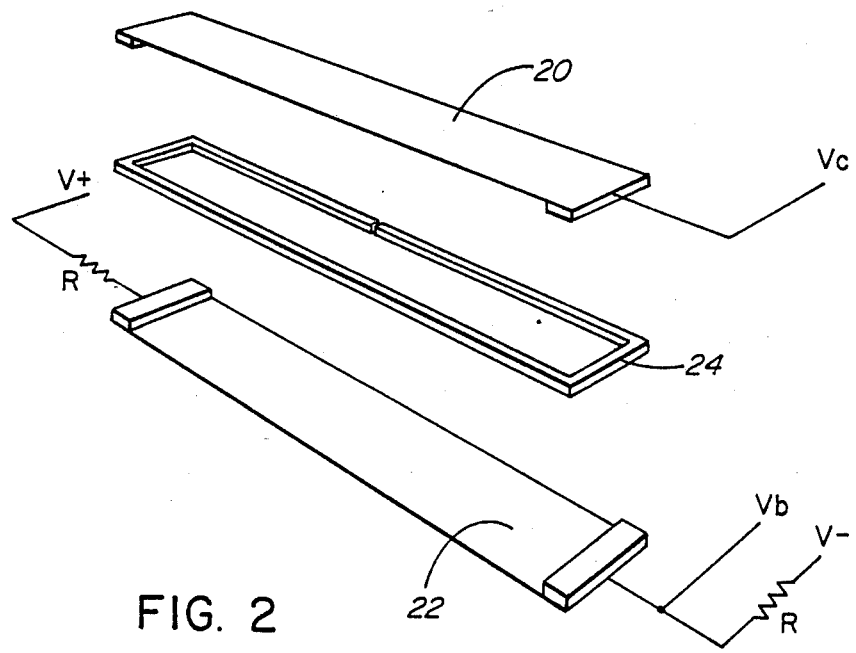
FIG. 2 is a part perspective, part schematic view of one form of touch sensitive strip.

Referring in detail to FIG. 2, each of the touch strips, which operate on a voltage dividing principle has a flexible conductive strip 20 overlaying a resistive substrate 22. The conductive strip and the substrate are normally separated from one another by an insulating frame 24 but can be locally brought together by pressing the strip downwardly at a desired location along the strip. A voltage gradient is established along the resistive substrate by applying voltages $V^+$, and $V^-$ through resistors R to electrodes contacting the substrate ends.

As shown schematically in FIG. 3 the touch strip has a power supply to establish the voltage gradient along the resistive substrate. The output of the touch strip is taken to the input of a filter/buffer unit and the output of the filter/buffer unit is taken to one input of an analog-to-digital converter. The analog-to-digital converter operation is controlled by a select/control logic circuit which is driven by timing impulses from a clock circuit. The operation of the clock circuit is determined by an interface circuit which also loads data from the analog-to-digital converter into a microprocessor unit. Outputs from the microprocessor unit are used to control operation of the touch strip input circuit and also to alter terminal functions in response to the strip being touched. Generally the control exercise by the microprocessor unit is divided into a generation of image data and the operation of control functions such as controlling the volume, rate or level of certain parameters of the image and other terminal functions.

An output voltage representing a position touched on the touch strip is monitored as the difference between potentials $V_c$ and $V_b$. The monitored potential difference is received at the filter/buffer circuit which monitors when a contact has been initially made at the touch strip, ascertains whether that contact is truly a deliberate actuation of the touch strip, and generates a voltage representing the position touched on the strip. The time constant of the filter circuit is appropriately set so as to register most strip actuations which are deliberate and so as not to register most of the touch strip contacts which are unintended.

In order for the microprocessor unit to accept data from the touch strip, the strip must be calibrated so that the range of monitored voltages $|V_c - V_b|$ and the corresponding relationship to input data is known.

Because the operator's fingers are relatively broad, finger contact resolution is typically within 1 centimeter whereas sampling resolution can be as high as 10 units per centimeter. Consequently, while a contact is made many values within a range of about 10 units can be generated. To avoid an input error at the microprocessor, previous values generated by the strip are stored and the difference between the stored and current input values are computed. If this difference is greater than a preset magnitude then a new value from the strip is generated and is either stored in a memory location to be polled by the microprocessor or generates a software interrupt.

The touch strips can be used in a variety of ways depending on the manner in which the microprocessor is programmed. In order to select the desired program one of the functional designation keys in the primary keyboard is pressed. Typical functional keys associated with the touch strips are soft-key designation, menu selection, cursor generation, graded control and scrolling.

For the soft-key designation the microprocessor is programmed to permit a touch strip to be notionally divided into a selected number of selected width individual keys. After pressing soft-key designation function key of the primary keyboard, the user presses another key to indicate the first or left-hand soft key is about to be selected, establishes the identity of that soft key, for example, DATE, by using the alphanumeric keyboard. Lastly the user establishes a key length both on the touch strip and within the associated display if the key designation is to be illustrated on the display. Optionally, the user can establish a neutral or spacer section between adjacent assigned key intervals within the touch strip before going on to program the second and subsequent selections along the touch strip. Once programmed, the terminal operator uses the terminal as if the touch strip were divided into a number of separate keys functioning essentially as an extension of the fixed keyboard.

By pressing the menu selection function key, a program is selected which enables the user to select one title from a list of displayed titles merely by pressing the touch strip (usually the vertically extending touch strip) at a location adjacent to the particular displayed title. Once having selected this title from the list the user then can perform any of a number of manipulating functions, for example displaying a further set of possible selections within the broad title selected.

When the cursor generation program is selected by pushing the appropriate functional key, a cursor is generated at a reference position in the terminal display the cursor being usable for many functions as is well known in the word processing art. In contrast to the soft-key and menu selection functions which enable selection along the screen width or the screen height, cursor manipulation depends upon pressing contacts at both strips to establish a position on the screen area. As with the linear applications, calibration or assignment of a mapping factor must be undertaken. For each of the vertical and horizontal strips the mapping factor, $M =$ screen range $\times 1/$strip range. To reposition the cursor from the reference to a selected position, the two touch strips are touched at positions corresponding to the XY co-ordinates of the selected position. Once the XY co-ordinates have been assigned, the cursor is automatically transferred from the reference to the selected display position. A word processing function is then performed. Part of the function may require movement of the cursor using the lateral touch strip. Once completed, the cursor is removed to the reference or another selected position by appropriately activating the horizontal and vertical touch strips.

By pressing the graded control key and an appropriate character key, one or both of the touch strips can be used to control a continuously varying quantity. Examples are sound volume (for telephone ringing or voice) and display brightness, contrast or colour determinants.

Again, using a touch strip to control a level or rate, it is necessary to map values from the strip to values that are in the range of possible levels or rates. Here the mapping factor $M =$ a range of levels or rates $\times 1/$strip range.

By pressing the scrolling key, the terminal is programmed to permit the displayed text or graphics to be moved vertically or laterally to display adjacent parts of the displayed matter of which the currently displayed field is just a part stored in memory. To operate the terminal in this mode, the user merely strokes the touch strips along their length in the direction in which the displayed field is to move.

Although the invention has been described in terms of two touch strips along respective adjacent edges of a display terminal screen, it will be appreciated that touch strips may extend along all the edges of the screen. Moreover, if desired, a bank of such touch strips can be mounted along each edge. In this latter case keys associated with the functional keyboard must permit switching between different ones of the banks of strips.

Although for simplicity the preferred form of touch strip uses a voltage dividing network and associated monitoring circuit, each of the touch strips may instead be embodied as a linear array of discrete touch sensitive areas, for example of capacitative character. When such a touch sensitive area is touched by the terminal user a corresponding input to a multiplexer changes state. A counter is operated to cycle through the addresses of the multiplexer and when an address corresponding to a touched area is generated an output from the multiplexer enables a buffer whereby the current counter output is transferred to the microprocessor.

What is claimed is:

1. A terminal comprising a rectangular display screen, display means for displaying an image on the screen, a position sensitive touch strip spaced from the screen, mounted along one side thereof and extending the length of the screen, voltage generating means for generating a voltage level in response to the touch strip being touched, the voltage level corresponding to the position at which the strip is touched, a selector for selecting one of a plurality of possible display modes, an input interface unit having inputs from said voltage generating means and from said selector, a microprocessing unit having an input from the input interface unit and an output to an output interface unit, the output interface unit having an output controlling said display means, the microprocessing unit having stored therein a control program which determines the display mode in response to an input from the selector and determines image detail in response to an input from the voltage generating means.

2. A terminal as claimed in claim 1 wherein in response to a selectable output from the selector, the control program defines both a plurality of individually energizable discrete lengths within the touch strip, and a corresponding plurality of regions of the display screen.

3. A terminal as claimed in claim 2 wherein the control program functions to preclude input data originating when the touch strip is touched other than at positions within said discrete lengths.

4. A terminal as claimed in claim 1, the terminal particularly adapted for a display operating mode in which the display depends on a continuously variably operating parameter, the terminal further comprising control means for controlling the value of the variable operating parameter, and wherein in response to a selected output of the selector, the control program initiates an output to select said control means and in response to an output of the touch strip, the control program initiates an output to the control means to drive the value of the parameter to a value corresponding to the position at which the touch strip is touched.

5. A terminal as claimed in claim 1 particularly adapted for a scrolling display operating mode wherein, in response to a selected output of the selector, the control program prepares the microprocessing unit to receive scrolling data, the control program further responding to an input from the touch strip corresponding to unidirectional stroking thereof to drive the display means to scroll the displayed image.

6. A terminal as claimed in claim 1 in which said touch strip is mounted at a location spaced from said side of said screen.

7. A terminal as claimed in claim 1 in which a second touch strip extends along another side of the rectangular screen in a direction substantially perpendicular to the direction in which the first touch strip extends, the terminal including a further voltage generating means for generating a voltage in response to the second touch strip being touched, the second voltage level corresponding to the position at which the second strip is touched.

8. A terminal as claimed in claim 7 particularly adapted for a display operating mode using a cursor wherein in response to a selected output of the selector, the control program prepares the microprocessing unit to receive cursor positional data and instructs the display means to generate a cursor in the displayed image, the control program further responding to inputs from the touch strips to drive the display means to alter the cursor position on the screen in directions parallel to the strips.

9. A terminal as claimed in claim 1 in which the screen is surrounded by a frame and the touch strip is mounted on the frame.

10. A terminal as claimed in claim 1 in which the touch strip is mounted by means of an adhesive.

11. A terminal as claimed in claim 1 in which the frame projects forwardly of the screen, the touch strip located on an edge of the frame immediately adjacent to the screen.

12. A terminal as claimed in claim 1 in which the strip is mounted on a control panel angled relative to the screen.

13. A terminal as claimed in claim 1 in which the screen is of rectangular form and the touch strip extends along one edge thereof.

14. A terminal as claimed in claim 2 in which the discrete lengths of the touch strip correspond in length and position to the plurality of regions in the screen adjacent to the touch strip designations and the screen regions.

15. A terminal as claimed in claim 4 in which the variable operating parameter is one of the group consisting of image brightness, image colour, and image scale.

16. A terminal as claimed in claim 14 in which the screen regions extend along a marginal portion of the screen immediately adjacent to the touch strip.

17. A terminal as claimed in claim 16 in which the display is of the raster scan type in which a frame consists of a plurality of horizontal scan lines, the touch strip being horizontal and the screen regions occupying a plurality of lines at the end of the raster scan.

18. A terminal as claimed in claim 16 in which the display is of the raster scan type having a plurality of horizontal scan lines, the touch strip extending vertically and the screen regions occupying vertically aligned parts at one end of the raster scan lines.

* * * * *